UNITED STATES PATENT OFFICE.

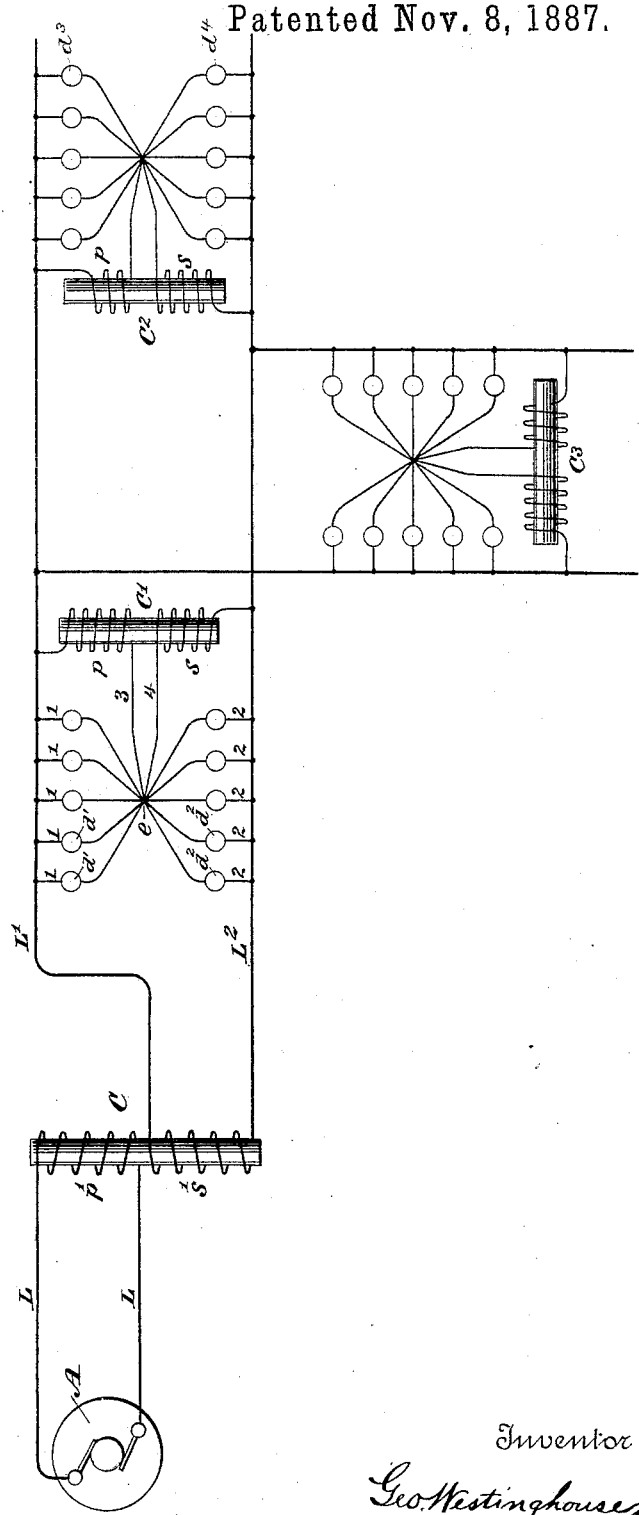

GEORGE WESTINGHOUSE, JR., OF PITTSBURG, PENNSYLVANIA.

SYSTEM OF ELECTRICAL DISTRIBUTION.

SPECIFICATION forming part of Letters Patent No. 373,037, dated November 8, 1887.

Application filed March 9, 1887. Serial No. 230,189. (No model.)

*To all whom it may concern:*

Be it known that I, GEORGE WESTINGHOUSE, Jr., a citizen of the United States, residing in Pittsburg, in the county of Allegheny and State of Pennsylvania, have invented certain new and useful Improvements in Systems of Electrical Distribution, of which the following is a specification.

The invention relates to a system of circuits and apparatus in which alternating, intermittent, or pulsatory electric currents are employed for operating translating devices.

The special object of the invention is to provide convenient means for securing a constant or an approximately constant difference of potential at the terminals of different groups of translating devices connected in the circuit.

The invention may be described in general terms as follows: From a generator or other source alternating, intermittent, or pulsatory currents are derived. Such currents are transmitted, either directly or through one or more electric converters, to two conductors extending to points at or near which the translating devices are to be located. The translating devices are arranged in groups, one terminal of each translating device in the one group being connected with one of the conductors referred to, while the remaining terminals of the devices in that group are all connected together. The devices in the second group each have one terminal connected with the second conductor and their remaining terminals united with the connected terminals of the first group. One coil of an electric converter or induction-coil is connected between the united terminals of one group of the translating devices and one of the conductors, and the other coil is connected between the united terminals and the other conductor. In case it is desired to maintain the same difference of potential at the terminals of the different translating devices of any two different groups thus formed, then the coils of the corresponding converter are preferably of equal value. If, however, it is desired to supply currents of a greater difference of potential to one group than to the other, then the coil connected in parallel circuit therewith is of greater length or greater inductive value.

The invention will be described more particularly in connection with the accompanying drawing, which is a diagram illustrating a general organization of circuits and apparatus adapted to carry out the invention.

Referring to the drawing, A represents a suitable source of alternating, intermittent, or pulsatory currents. The respective poles of this source are connected by a conductor, L, through the primary coils P' of an electric converter, C. The secondary coil $s'$ of this converter has its respective terminals connected with conductors L' and $L^2$, leading to points where it is desired to employ the currents for operating translating devices—such, for instance, as incandescent electric lamps $d'$ $d'$ and $d^2$ $d^2$. The translating devices $d'$ $d'$ are connected in the circuit of conductors 1 1 1, respectively, derived from the conductor L'. The conductors 1 1 are all electrically connected with each other beyond the translating devices, as shown, for instance, at $e$. The translating devices $d^2$ $d^2$ are connected in conductors 2 2 2, derived from the conductor $L^2$. The conductors 2 2 2 are also united or electrically connected with each other and with the conductors 1 1 1, as shown at $e$.

Between the point $e$ and the conductor L' there is connected one coil, $p$, of a converter, C', by means of conductor 3. The second coil, $s$, of this converter is connected between the point $e$ and the conductor $L^2$ by means of a conductor, 4. These coils are in reality two sections of one continuous coil wound upon a soft-iron core. It is apparent that the converter C' will serve to maintain a constant relative difference of potential between the conductor L' and the point $e$ and between the point $e$ and the conductor $L^2$. The portion $p$ of the coil serves, in case the current forced through it exceeds the normal amount, as a primary to the coil $s$, thus tending to raise the difference of potential between the point $e$ and the conductor $L^2$, and in this manner yielding current to the translating devices $d^2$, thus maintaining the relative degree of brilliancy between the lights $d'$ and $d^2$. The brilliancy of both sets of lights will be determined by the total difference of potential between the lines L' and $L^2$.

It is evident that by properly proportioning the coils $p$ and $s$—as shown, for instance, in connection with the converters C² and C³—the devices d³ may be run at a different potential from the lights shown at d⁴.

I claim as my invention—

1. The combination, with a source of alternating, intermittent, or pulsatory currents, of two conductors derived therefrom, a group of translating devices each having one terminal connected with one of said conductors and their other terminals connected with each other, a second group each having one terminal connected with the other conductor and their remaining terminals connected with the united terminals of the first group, and an electric converter having one coil included in the circuit between the connected terminals and one of said conductors and the other coil included in circuit between the connected terminals and the other conductor.

2. The combination of two conductors respectively designed to convey alternating, intermittent, or pulsatory currents, a group of translating devices each having one terminal connected with one of said conductors and the other terminal connected with each other, a second group of translating devices each having one terminal connected with the other of said conductors and their remaining terminals connected with the united terminals of the first group, and an electric converter having one coil included in parallel circuit with the first group and the other coil in parallel circuit with the second group.

3. The combination of two conductors respectively designed to convey alternating, intermittent, or pulsatory currents, a group of translating devices each having one terminal connected with one of said conductors and the other terminals connected with each other, a second group of translating devices each having one terminal connected with the other of said conductors and their remaining terminals connected with the united terminals of the first group, and an electric converter having one coil included in parallel circuit with the first group and the other coil in parallel circuit with the second group, the coils of said converter having a relative inductive value proportionate to the difference of potential required at the terminals of the groups.

4. The combination, with two main lines, of an electric converter having a primary and secondary coil connected in series between said lines, translating devices connected in multiple arc with one of said coils, and other translating devices connected in multiple arc with the other of said coils.

In testimony whereof I have hereunto subscribed my name this 4th day of March, A. D. 1887.

GEO. WESTINGHOUSE, Jr.

Witnesses:
DANL. W. EDGECOMB,
CHARLES A. TERRY.